F. A. KJELLIN.
METHOD OF TREATING ORES BY THE BLAST FURNACE PROCESS.
APPLICATION FILED OCT. 23, 1909.
983,453.
Patented Feb. 7, 1911.
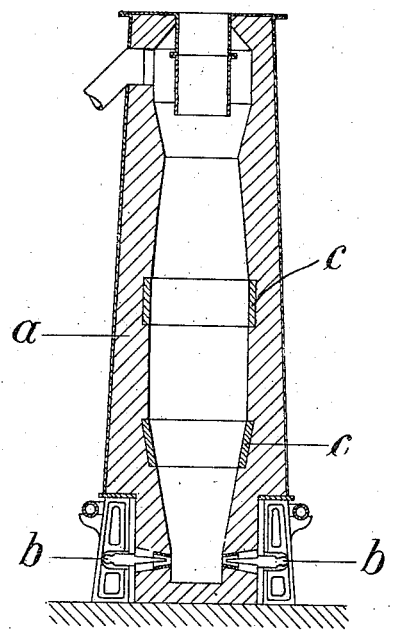
Witnesses:
M. Hoefling
D. E. Burdine
Inventor:
Fredrik Adolf Kjellin,
by B. Singer,
Atty.

UNITED STATES PATENT OFFICE.

FREDRIK ADOLF KJELLIN, OF STOCKHOLM, SWEDEN.

METHOD OF TREATING ORES BY THE BLAST-FURNACE PROCESS.

983,453. Specification of Letters Patent. Patented Feb. 7, 1911.

Application filed October 23, 1909. Serial No. 524,239.

*To all whom it may concern:*

Be it known that I, FREDRIK ADOLF KJELLIN, engineer, a subject of the King of Sweden, residing at Sturegatan 56, Stockholm, Sweden, have invented certain new and useful Improvements in Methods of Treating Ores by the Blast-Furnace Process, of which the following is a specification.

In blast-furnaces of the design now in use experience, as is well known, has proved that the difference of coal consumption per ton of iron for poor and rich ores is considerably greater than is required for melting the greater or smaller quantity of gangue accompanying the ore. This circumstance is, to a certain degree analogous with that occurring when hot blast is used, which gives a greater saving of coal than that corresponding to the additional heat quantity supplied by the heating of the blast. The peculiar circumstance, that the coal consumption in melting poor ores is increased to a greater extent than the heat required for melting the gangue must depend upon the presence of a greater quantity of gangue in the charge affecting the reduction process in the middle part of the furnace and especially in the part thereof, where the reduction of the lower oxids of iron (probably $Fe_6O_7$) to metallic iron begins. This fact might be explained in the following way. If the reduction of the ore is supposed to take place gradually, so that all the ore is reduced to $Fe_6O_7$ before metallic iron begins to form, there is one cross-section of the furnace, immediately above which the ore is reduced to $Fe_6O_7$, while immediately beneath the same part of $Fe_6O_7$ is reduced to metallic iron. The composition of the gases ascending through the furnace must then at the passage of the said section fulfil the following condition: The proportion between their percentage of carbon monoxid and of carbon dioxid must correspond to equilibrium between these gases and carbon at the temperature prevailing in the section.

The ascending gases must have delivered, in the part of the furnace below the aforesaid section, the quantity of heat required for both the reduction of $Fe_6O_7$ to Fe and for heating and melting of iron and gangue already heated to the temperature prevailing in the said section.

The use of poor ores necessitates a greater quantity of heat in the part of the furnace below the aforesaid section (where the reduction to metallic iron begins) and consequently a greater consumption of coke and blast per ton of iron. The increased amount of heat thereby produced in the lowest part of the furnace causes an increased reduction of ore by means of solid carbon in the middle part of the furnace and consequently a diminution of the reduction to metallic iron by means of carbon monoxid. As a consequence of this, the gases coming in contact with poor ores will have less percentage of carbon dioxid and higher temperature than with rich ores at the section where the reduction to metallic iron begins. The combustion of the coke thus becomes more imperfect, and the escaping gases have, as aforesaid, a higher temperature and constitute, moreover, a larger quantity for the same quantity of iron treated. Here lies the reason for the fact, that the coke consumption per ton of iron in treating poor ores is greater than that corresponding to the fusion heat of the increased quantity of gangue in the said poor ore.

The present invention has for its object to overcome the above mentioned defects and to make it possible to treat iron ores in the blast-furnace under more favorable conditions than hitherto. This is attained by supplying, in an ordinary blast-driven furnace, by electrical heating an additional amount of heat to the descending charge in that part of the furnace, where the reduction of the lower oxids of iron to metallic iron begins. The electrical heating is preferably effected by conducting an electric current through the charge at this point, whereby the current can be led through electrodes or contact plates of carbon or of mixtures of carbon with magnesia, lime or other compounds conductive to the current at a high temperature. The additional heating causes a reduction of the heat which otherwise is required from the ascending gases to heat the descending charge, and the said additional heat may thus be rather small in comparison with the total heat required in a blast-furnace, on account of its serving principally to eliminate the influence of the charge on the reaction in that part of the furnace where the production of metallic iron takes place.

In the accompanying drawing a longitudinal section of a blast-furnace is illustrated, provided with means for conducting an electric current through the charge at that part of the furnace, where the reduction of the lower oxids of iron to metallic iron begins. In this drawing *a* is the shaft, *b* the twyers for the blast and *c, c,* two annular electrodes connected to a source of electricity in such a manner that an electric current passes between them through the charge, which thereby is heated. A quantity of heat corresponding to a heating of the charge a few hundred degrees C. will thus be sufficient. By such an additional heating the influence of a greater or smaller quantity of gangue in the ore upon the reactions in the furnace on account of its specific heat is thus eliminated, and in analogy with the use of hot blast a coal saving is obtained, which is greater than that corresponding to the quantity of heat supplied.

I am aware that it has previously been proposed to produce in a blast or melting furnace of ordinary construction, or in a blast-furnace in which the main part of the heat is produced by combustion of an excess of fuel by means of a blast, a supplemental quantity of heat by means of electricity in one or more sections of the furnace, but according to my present invention I contemplate electrically heating the descending charge in that section of a blast-furnace where the reduction of the lower oxids of iron to metallic iron begins, for the purpose already mentioned.

I claim:—

The method of treating iron ores in blast-furnaces, which consists in feeding a charge of iron ore and fuel into a blast-furnace, heating the entire charge in the ordinary manner, and passing an electric current through the charge in that section of the furnace where the reduction of the lower oxids of iron to metallic iron begins, for the further heating thereof.

In testimony whereof I have signed my name to this specification in the presence of two subscribing witnesses.

FREDRIK ADOLF KJELLIN.

Witnesses:
 H. TELANDER,
 BIRGER NORDFELDT.